J. W. BARRY.
COCK OR FAUCET.
APPLICATION FILED MAY 13, 1908.
925,153.
Patented June 15, 1909.
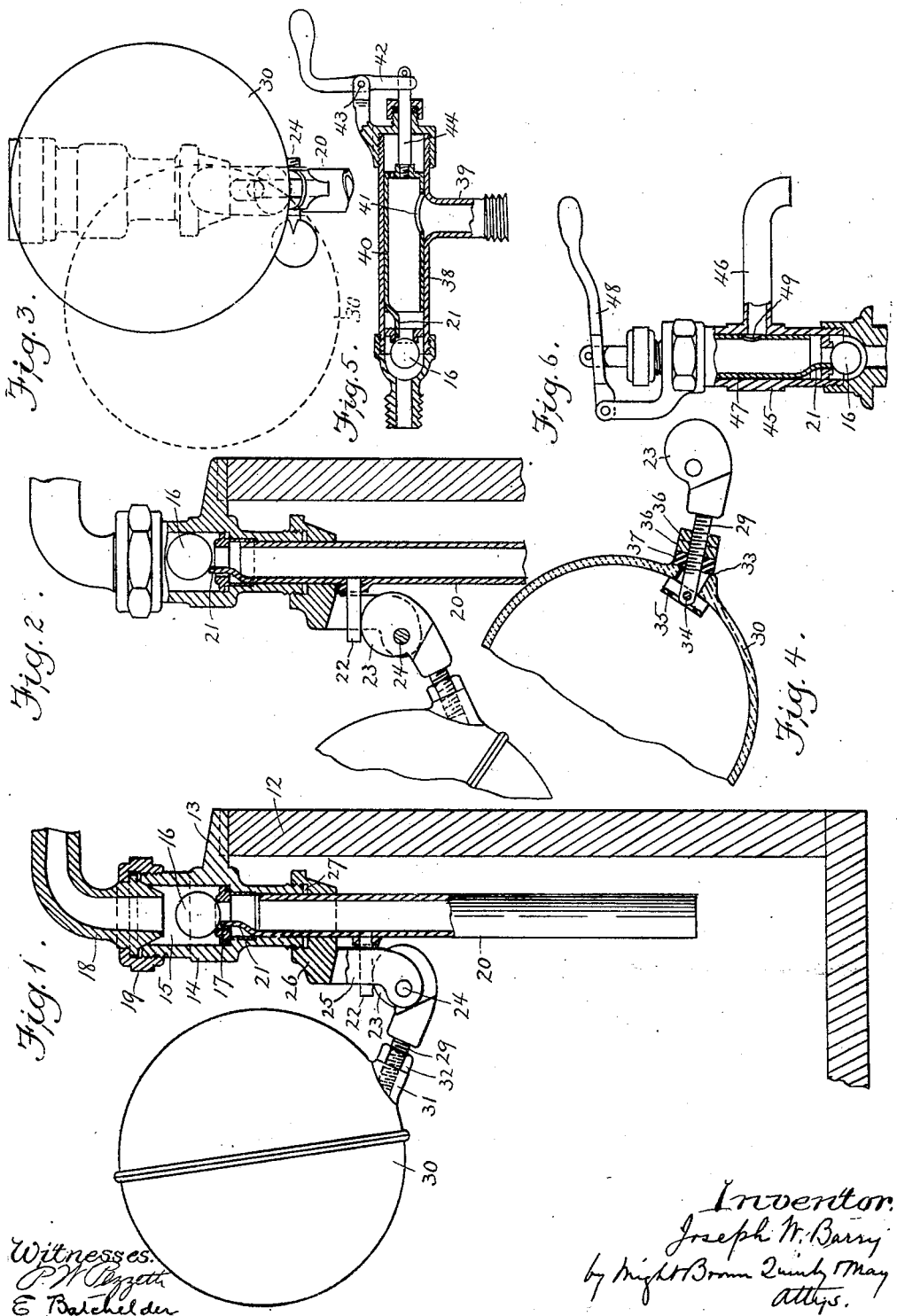
Witnesses.
Inventor.
Joseph W. Barry

UNITED STATES PATENT OFFICE.

JOSEPH W. BARRY, OF EVERETT, MASSACHUSETTS.

COCK OR FAUCET.

No. 925,153.        Specification of Letters Patent.        Patented June 15, 1909.

Application filed May 13, 1908. Serial No. 432,598.

*To all whom it may concern:*

Be it known that I, JOSEPH W. BARRY, of Everett, in the county of Middlesex and State of Massachusetts, have invented certain new and useful Improvements in Cocks or Faucets, of which the following is a specification.

This invention relates chiefly to so-called ball cocks employed to control the admission and escape of water from flushing tanks, the liquid controlling valve of the cock being opened and closed by the movement of a float supported by a body of water in the tank, the float acting through suitable intermediate mechanism in the valve. Certain features of the invention may, however, be embodied in cocks or faucets operated by hand, or by other means than a float.

One object of the invention is to provide a cock or faucet having a valve adapted to be held closed by the fluid pressure at the inlet side, and to be opened against said pressure with the minimum expenditure of power, and closed without liability of the objectionable noise known as water hammer.

The invention also has for its object to provide a ball cock, the valve of which is adapted to be operated as above indicated, the construction of the cock having certain other advantages including simplicity, compactness of form, adjustability, and in which the escape of water while the valve is open shall be free from objectionable noise.

The invention consists in the several improvements which I will now proceed to describe and claim.

Of the accompanying drawings forming a part of this specification, Figure 1 represents a sectional view of a portion of a flushing tank and a ball cock embodying my invention applied thereto, the cock being shown partly in section and partly in elevation, and its valve being shown in its closed position. Fig. 2 represents a view similar to portions of Fig. 1 showing the valve open. Fig. 3 represents a side elevation of the cock in the position shown in Fig. 1. Fig. 4 represents a sectional view representing certain details of construction. Fig. 5 represents a sectional view of a modification representing certain features of my invention applied to a faucet. Fig. 6 represents a sectional view of another modification showing certain features of the invention applied to a basin cock.

The same reference characters indicate the same parts in all the figures.

Referring for the present to Figs. 1, 2, 3 and 4: 12 represents one side of a flushing tank to which the hereinafter described ball cock embodying my invention is attached by suitable means such as by ears 13 formed on the casing of the ball cock and screwed to the upper edge of the tank. In the embodiment of my invention here shown the cock comprises a casing 14 which is enlarged at one end and reduced at its opposite end, each end being externally screw-threaded. Within the casing 14 is a chamber 15 containing a spherical valve 16 which is normally held by fluid pressure against a valve seat 17 at the inner end of the chamber. To the larger end of the casing 14 is connected a supply pipe 18 by means of a flanged coupling nut 19 engaged with the external thread of the larger end of the casing. 20 represents a discharge tube which has a sliding fit in the reduced portion of the casing 14 below the valve seat. Said discharge tube has on its upper end a finger 21 which projects into the valve seat and is eccentrically arranged therein; that is to say, the finger is at one side of the center of the seat. The tube 20 is movable endwise and is adapted to hold the finger 21 below the valve seat as shown in Fig. 1 when the valve is closed, and to project said finger above the valve seat as shown in Fig. 2, the finger being thus caused to tip the spherical valve toward one side of the chamber and unseat the valve gradually, the movement of the valve being somewhat similar to that which it would have if it were hinged to the casing. A valve held to its seat by pressure at the inlet side and a finger movable through the seat and eccentrically arranged relatively thereto so that it is adapted to give the valve a tipping or swinging motion, are important characteristics of my invention for the following reasons, namely: First, in opening the valve, the tipping movement enables the valve to be opened against the fluid pressure with the minimum expenditure of power, or in other words, with less power than would be required if the valve had a rectilinear movement toward and from its seat. Secondly, the finger when projected as shown in Fig. 2 holds the valve at one side of the chamber and in such position that when it is allowed to close upon the seat, its closing movement will also be a swinging or tipping movement, and will therefore be more gradual than if the movement of the valve toward its seat were rectilinear, the result being an absence of water hammer when the valve closes.

When the spherical valve and the valve-tipping finger are employed in a ball cock, the preferred means of moving the finger to open the valve and permit its closing movement are those shown in Figs. 1, 2, 3 and 4. The tube 20 is provided with a laterally projecting stud 22 which bears upon a perimeter of a cam 23 fulcrumed at 24 between ears 25 formed on a nut 26 which is engaged with the threaded lower end of the cock casing 14. The nut 26 has a cavity 27 surrounding the tube 20 adapted to contain packing material to prevent leakage of water around said tube, the nut 26 being contracted below the cavity 27 and having a sliding fit on the tube 20, the latter being adapted to move vertically in the nut and in the lower portion of the casing 14. The cam 23 constitutes the short arm of a bell crank lever, the longer arm of which has a shank 29 with which is engaged a float 30 which may be of any suitable form and construction, the form being preferably spherical. The float 30 is supported by the accumulation of water in the tank 12, and when the float is raised by the water to the position shown in Fig. 1, the cam 23 permits the seating of the valve 16 by the inlet pressure, the tube 20 moving downwardly with the valve until the latter is seated, whereupon further entrance of water into the tank ceases. When water is drawn from the tank, the float descends and its cam 23 acting upon the stud 22 raises the tube 20, finger 21 causing the described tipping displacement of the valve 16. It will be seen by reference to Figs. 1 and 2 that a comparatively short upward movement of the finger 21 widely separates the valve from its seat and insures an ample opening for the passage of water through the valve seat.

To permit an adjustment of the float 30 and a variation of the accumulation of water in the tank, I connect the float eccentrically with the shank 29, in such manner that partial rotation of the float will alter its height relatively to its fulcrum, and thus regulate the quantity of water that may be accumulated in the tank. In Figs. 1 and 2 I have shown the float provided with an internally threaded shank or nipple 31, the arrangement of which is approximately tangential with the float so that when the float is turned on the shank 29, its center will be either raised or lowered as the case may be. A lock nut 32 is engaged with the shank 29 to secure the float in any position to which it may be turned thereon. Fig. 4 shows a float which is or may be a hollow glass ball having a beveled seat 33 on one side, such seat surrounding an opening through which the lever shank 29 passes. To the inner end of said shank is pivoted at 34 a head 35 which bears upon the inner surface of the float and extends across the opening. Said head is adapted to slide on the inner surface of the float crosswise of the orifice therein, and thus conform to different adjustments of the float caused by its partial rotation on the lever. The shank 29 is provided with lock nuts 36 between which and the seat 33 is interposed a washer 37 of suitable compressible material to prevent injury to the seat 33 which might result if the inner lock nut 36 bore directly upon such seat.

The arrangement shown in Fig. 4 permits a similar adjustment of the float to that shown in Figs. 1 and 2. In Fig. 3, two positions of the float are shown, one in full lines and the other in dotted lines.

In Figs. 5 and 6 modifications of my invention are shown in which the valve displacing finger is moved by hand to displace the valve. Fig. 5 shows a faucet having a horizontal casing 38 and an outlet 39. The valve opening finger 21 is formed on a tube 40 which has a sliding fit within the casing 38 and has an opening 41 coinciding with the outlet 39. The tube is moved to cause the finger to open the valve by means of a hand lever 42 pivoted at 43 to an ear on the end of the casing, one arm of the lever being engaged with a stem 44 affixed to the tube 40.

Fig. 6 shows a basin cock in which the casing 45 is vertically arranged and has a horizontal outlet 46. In this case the finger 21 is formed on a tube 47 which is vertically movable in the casing 45 by lever 48, the tube having an orifice 49 adapted to coincide with the outlet 46.

The valve may be made of hard rubber, vulcanized fiber or any other suitable material. When the valve is arranged as shown in Figs. 5 and 6, its specific gravity should be such that it may be readily held to its seat by the fluid pressure, aided if desired by a light spring.

It will be seen that the ball cock embodiment of the invention is particularly desirable on account of its compactness, a very short lever being suitable so that the float may be located close to the casing. The discharge tube 20 projecting below the surface of the water in the tank makes the discharge of water noiseless. The nut 26 may be partially turned on the casing to cause the float to project in any desired direction therefrom. The coupling nut 19 permits the valve chamber to be readily uncovered to obtain access to the valve and its seat.

I claim:

1. A cock comprising a casing having a valve chamber, a valve seat forming the outlet of said chamber, a spherical valve movable in the chamber, and located in the path of the entering liquid, so that it is adapted to be held by the liquid pressure against the seat, a valve-opening finger extending through the valve seat and bearing loosely against the valve, means for moving the finger longitudinally in the valve seat to cause it to open the valve, the finger being eccentrically arranged relatively to the valve seat, whereby the valve is opened with a tipping motion, and means for guiding the finger in a rectilinear path, and maintaining its eccentric arrangement relatively to the valve seat, the finger being formed to move in the valve seat without obstructing the passage therethrough.

2. A cock comprising a casing having a valve chamber, a valve seat forming the outlet of said chamber, a spherical valve movable in the chamber and located in the path of the entering liquid so that it is adapted to be held by fluid pressure against the seat, a discharge tube located at the outlet end of the valve chamber, said tube being of greater internal diameter than the valve seat, to permit a smooth, frictionless flow of the outgoing liquid, and slidingly connected with the casing, and a valve-opening finger which is attached to the tube and offset inwardly from one side thereof, and is movable by the tube through the valve seat against the valve, said finger being eccentrically arranged relatively to the valve seat whereby it is caused to tip the valve in opening it, and means for moving the tube and finger to open the valve.

3. A cock comprising a casing having a valve chamber, a valve seat forming the outlet of said chamber, a valve movable in the chamber and adapted to be held by fluid pressure against the seat, a discharge tube having a sliding connection with the casing and provided with a finger which is movable in the valve seat against the valve, a float movable relatively to the casing, and connections between said float and the discharge tube, whereby a downward movement of the float is caused to raise the tube and displace the valve.

4. A cock comprising a casing having a valve chamber, a valve seat forming the outlet of said chamber, a valve movable in the chamber and adapted to be held by fluid pressure against the seat, a discharge tube having a sliding connection with the casing and provided with a finger which is movable in the valve seat against the valve, and a lever fulcrumed on the casing and having a shorter arm engaging a projection on the tube, and a longer arm provided with a float.

5. A cock comprising a casing having a valve chamber, a valve seat forming the outlet of the chamber, and a guide below the valve seat, a valve in said chamber adapted to be closed by fluid pressure, a discharge tube movable in said guide and projecting downwardly from the casing, said tube having a valve-displacing finger and a lateral stud or projection, and a lever fulcrumed on the casing and having a shorter arm engaging said projection, and a longer arm provided with a float.

6. A cock comprising a casing having a valve chamber, a valve seat forming the outlet of the chamber, and a guide below the valve seat, a valve in said chamber adapted to be closed by fluid pressure, a discharge tube movable in said guide and projecting downwardly from the casing, said tube having a valve-displacing finger and a lateral stud or projection, a packing nut engaged with the said guide and having a contracted tube guiding portion, and ears forming guides for said projection, and a lever fulcrumed between said ears and having a shorter arm engaged with the projection and a longer arm provided with a float.

7. A cock comprising a casing having a valve seat, a valve adapted to close said seat, a float lever fulcrumed on the casing, valve opening connections between the lever and the valve, and a float eccentrically mounted on the lever and adapted to be adjusted by a rotative movement.

8. A cock having a float lever, and a float rotatively mounted on the lever, the float being eccentrically arranged so that its rotation changes its height.

9. A cock having a float lever, and a float rotatively mounted on the lever, the float having an orifice surrounded by a beveled seat, and the lever having an arm which passes through said orifice, a pivoted head adapted to extend across the orifice within the float, and to slide on the inner surface of the float, and a clamping device adapted to engage said seat.

In testimony whereof I have affixed my signature, in presence of two witnesses.

JOSEPH W. BARRY.

Witnesses:
C. F. BROWN,
P. W. PEZZETTI.